United States Patent
Khudenko

[11] Patent Number: 5,919,367
[45] Date of Patent: *Jul. 6, 1999

[54] BIOLOGICAL-ABIOTIC WASTE TREATMENT

[76] Inventor: Boris Mikhailovich Khudenko, 744 Moores Mill Rd., Atlanta, Ga. 30327

[*] Notice: This patent is subject to a terminal disclaimer.

[21] Appl. No.: 09/100,160

[22] Filed: Jun. 18, 1998

Related U.S. Application Data

[63] Continuation-in-part of application No. 08/982,030, Dec. 1, 1997, Pat. No. 5,798,043.

[51] Int. Cl.⁶ ........................................... C02F 3/30
[52] U.S. Cl. ........................... 210/605; 210/614; 210/630; 210/631
[58] Field of Search ..................... 210/603, 605, 210/610, 614, 623, 625, 630, 631

[56] References Cited

U.S. PATENT DOCUMENTS

| | | | |
|---|---|---|---|
| 3,047,492 | 7/1962 | Gambrel | 210/675 |
| 4,029,575 | 6/1977 | Bykowski et al. | 210/625 |
| 4,614,587 | 9/1986 | Andersson et al. | 210/603 |
| 4,655,925 | 4/1987 | Tabata et al. | 210/605 |
| 5,075,007 | 12/1991 | Morpen et al. | 210/614 |
| 5,094,752 | 3/1992 | Davis et al. | 210/614 |
| 5,185,079 | 2/1993 | Dague | 210/603 |
| 5,500,123 | 3/1996 | Srivnstava | 210/603 |
| 5,587,079 | 12/1996 | Rowley et al. | 210/605 |
| 5,630,942 | 5/1997 | Steiner | 210/603 |
| 5,651,891 | 7/1997 | Molof et al. | 210/625 |
| 5,670,047 | 9/1997 | Burk | 210/614 |

*Primary Examiner*—Christopher Upton

[57] ABSTRACT

This is an oxidation-reduction treatment of wastewater with biomass, comprising (a) a step of charging in the said system a recuperable oxidation-reduction mediator specie (metallic ions, metal containing species, oxyions with variable oxidation-reduction states, redox ion exchange materials, and combinations thereof), (b) a step of oxidizing terminal reducing agents with participation of the said recuperable oxidation-reduction mediator species (nitrification treatment, anoxic treatment, denitrification treatment, facultative anaerobic treatment, sulfate reduction, carbonate reduction, sludge conditioning, biomass oxidation treatment, and combinations thereof), (c) a step of reducing primary oxidizing agents with participation of the said recuperable oxidation-reduction mediator species (oxygen enriched treatment, aerobic treatment, nitrification treatment, anoxic treatment, denitrification treatment, facultative anaerobic treatment, and combinations thereof), (d) a step of retaining the said recuperable oxidation-reduction mediator specie in the treatment system in a form insoluble in the effluent, and wherein at least a portion of the said biomass together with the said recuperable oxidation-reduction mediator species are repeatedly treated in the said steps (b) and (c). The metal containing species include iron, nickel, cobalt, manganese, vanadium, and combinations thereof. This method improves the removal of hydrocarbons, nutrients, toxic and recalcitrant organics, and reduces biomass generation.

21 Claims, 5 Drawing Sheets

BIOLOGICAL-ABIOTIC WASTE TREATMENT

CROSSREFEENCES

This application is a continuation in part of the U.S. application Ser. No. 08/982,030, filing date of Dec. 1, 1997, now U.S. Pat. No. 5,798,043.

FIELD OF INVENTION

The invention belongs to biological-abiotic systems for waste treatment, and more specifically is a method for conjugate degradation and reduction of carbonaceous BOD or COD, toxic and recalcitrant organics, and nitrogen and phosphorus, and for minimization of the excess biosolids.

BACKGROUND

Biological processes are routinely used for removing carbonaceous BOD and COD. These processes involve oxidation and reduction steps and biomass synthesis. In the last thirty years, the so-called advanced process modifications were developed to also remove phosphorus and nitrogen. These systems include various combinations of aerobic, fermentation, facultative anaerobic, anoxic, nitrification and denitrification zones. In nitrogen removal systems, the nitrogen containing species, usually ammonia, are biologically oxidized (nitrified) to nitrites and nitrates, following by a biological reduction (denitrification) of nitrites and nitrates to nitrogen and gaseous oxides of nitrogen. Phosphorus removal systems are conducted via, first, exposing the recycle sludge to facultative anaerobic conditions wherein acetic acid is formed and phosphorus is released, and, second, exposing biomass in the sludge to aerobic conditions wherein the so-called luxurious uptake of phosphorus is believed to occur. These systems are described in books "Phosphorus and Nitrogen Removal from Municipal Wastewater, Principles and Practice" Second Edition, Richard Sedlak, Editor, Lewis Publishers, 1991, "Biological and Chemical Systems for Nutrient Removal" A Special Publication, Prepared by the Task Force on Biological and Chemical Systems for Nutrient Removal, Movva Reddy, Chair, Water Environment Federation, 1998, and in patents, for example, U.S. Pat. Nos. 2,788,127, 2,875,151, 3,236, 766, 3,964,998, 4,056,465, 4,162,153, 4,183,807, 4,183,808, 4,183,809, 4,183,810, 4,271,026, 4,488,967, 4,500,427, 4,500,429, 4,874,519, 4,867,883, 4,874,519, 4,917,805, 4,948,510, 4,999,111, 5,013,441, 5,022,993, 5,076,928, 5,076,929, 5,098,572, 5,160,043, 5,182,021, 5,213,681, 5,288,405, 5,480,548, 5,601,719, and 5,651,891.

The main problem with biological nutrient removal is that it is difficult to maintain balance between phosphorus and organics needed for the acetic acid production, and between nitrogen species and organics needed in the denitrification processes. Other problems may include low process efficiency, seasonal instabilities due to low temperatures, difficulties with pH control, complex systems, and complex operations. Additionally, the volume and costs of advanced biological reactors far exceed that of the conventional aerobic systems with complete nitrification. In biological phosphorus removal, there is a problem of phosphorus dissolution in the subsequent process steps, for example, during sludge treatment. Advanced biological systems usually require more energy than conventional systems. Large mass and volume of excess biosolids, also known as excess sludge or biomass, is generated.

Phosphorus can be easily removed with reagents, primarily, iron or aluminum ions in forms of insoluble phosphates. The process can be conducted in biological reactors so that little equipment is required. The stoichiometric iron and aluminum requirements are only 0.88 mg Fe and 0.28 mgAl per 1 mg $P_2O_4$. The actual metal requirement is significantly greater. Chemical nitrogen removal involves difficult processes and is not practiced for low nitrogen concentrations in municipal and many industrial wastewater types. A co-precipitation of phosphorus and nitrogen (ammonia) as struvite ($MgNH_4PO_4$) have also been discussed, but not practiced yet. The use of reagents contributes to the sludge mass. Increased mass of the excess sludge is cited as the argument against chemical phosphorus removal.

Anaerobic, aerobic, and coupled or combined anaerobic-aerobic biological systems are also used for treatment of dilute and concentrated industrial waste for organics and nutrients removal, as well as for removal and destruction of toxic and recalcitrant organics, heavy metals, sulfur containing compounds, and other applications. In these applications, biological processes may suffer problems similar to those experienced with advanced systems and also application specific problems. For example, in some applications, toxicity is a problem, in other applications, odorous constituents are emitted, while in others the process stability is difficult to control.

OBJECTIVES

Accordingly, an objective of the present invention is to provide a simple, reliable, efficient, stable, and economical system for removal of organics, nutrients, and other target constituents, while generating little or no waste biological solids. Other objectives of the present invention will become clear from the ensuing description.

SUMMARY OF INVENTION

The essence of this method is that in biological treatment of wastewater having oxidation and reduction steps, an improvement is provided comprising a step of charging at least one recuperable oxidation-reduction mediator specie. For example, this can be a method of biological wastewater treatment with biomass in a system comprising at least one aerobic biological wastewater treatment step, whereby the target organic and inorganic constituents in the said wastewater and the recuperable oxidation-reduction mediator specie charged in the system become at least partially oxidized to form new biomass, carbon dioxide, water, and nitrites and nitrates, and/or at least one step of oxidizing the said biomass, wherein the said biomass is repeatedly treated in the said aerobic and biomass oxidizing steps, whereby the said recuperable oxidation-reduction mediator species become reduced in the said biomass oxidation step to a lower oxidation state while oxidizing and minimizing biomass.

This can also be a method of biological wastewater treatment with biomass in a system comprising at least one aerobic biological wastewater treatment step, whereby the target constituents in the said wastewater and the recuperable oxidation-reduction mediator species charged in the said system are oxidized to form new biomass, carbon dioxide, water, and nitrites and nitrates and higher valence recuperable oxidation-reduction mediator species, at least one denitrification step, whereby the said nitrites and nitrates are reduced to form gaseous nitrogen forms and the said abiotic species are converted to the lower valence, a step of charging at least one recuperable oxidation-reduction mediator species in the said system. Selected recuperable oxidation-reduction mediator species can precipitate phosphorus as insoluble phosphates from the said wastewater in the said system simultaneously with other process steps. Some ion exchange mediator species can also remove phosphorus via ion exchange mechanisms.

The said wastewater is defined herein as domestic or industrial wastewater, aqueous industrial, agricultural and production materials, industrial, agricultural and production gases, polluted air, gaseous and vent emissions, solid waste, materials of plant, animal, or fossil origin, and solid industrial, agricultural or production streams, and combinations thereof. It is understood that gaseous pollutants can be washed with a liquid and treated in the present system, while solid materials can be converted to slurries with water.

The said aerobic step can be selected from the group comprising oxygen enriched steps (including high purity oxygen), air aerated aerobic treatment, nitrification treatment, to a lesser degree anoxic treatment, denitrification treatment, facultative anaerobic treatment, and combinations thereof. The said biological reduction step can be selected from the group comprising anoxic treatment, denitrification treatment, facultative anaerobic treatment, ferric iron reduction, sulfate reduction, carbonate reduction (methanation), and combinations thereof. The said step of biomass oxidation is preferably anaerobic, ferric ion reduction, or facultative anaerobic step. These steps are given to the skillful in art as benchmarks for orientation and approximate evaluation of the oxidation-reduction conditions in the system.

The said recuperable oxidation-reduction mediator species with variable oxidation state can be selected from the group comprising zero valence metal pieces, metallic ions, metal-containing oxy ions, nonbiodegradable and insoluble inorganic constituents with variable oxidation-reduction states, nonbiodegradable and insoluble organic constituents with variable oxidation-reduction states, and combinations thereof. The said metallic and metal-containing species include metals selected from the group comprising iron, nickel, cobalt, manganese, vanadium, and combinations thereof. Ion exchange resins with oxidation-reduction groups, also known as redox exchangers, and similarly activated and modified natural organic and inorganic materials known to skillful in art or specifically developed in the future for particular applications can also be used as recuperable abiotic species in this process.

Iron is practicable recuperable abiotic specie. A simplified pH-potential diagram for iron is shown in FIG. 1. More detailed diagrams can be found, for example, in "Atlas of Electrochemical Equilibria in Aqueous Solutions" by Marcel Pourbaix, Pergamon Press, 1966. FIG. 1 shows lines a and b separating the domain of stability of water and the oxidation and reduction domains of water. A range of pH from 6 to 8.5 generally considered as acceptable for biological processes is hatched in FIG. 1. Within this range, iron is found in a higher valence as an insoluble $Fe(OH)_3$, or as divalent ions $Fe^{2+}$, and at lower oxidation-reduction potentials (ORP) in the presence of sulfides, as ferrous sulfide, and at pH greater than approximately 8.35 as ferrous carbonate. The iron species of the main interest here are trivalent (ferric) and divalent (ferrous) forms. In this method, ferric and ferrous species are respectively an oxidant and a reducing agent. Solid line in FIG. 1 separates oxidizing and reducing conditions for these species. Accordingly, process steps conducted at pH and ORP above the solid line are called herein oxidation steps, and those below solid line are reduction steps. The domain of metallic (zero-valence) iron is located low in FIG. 1 beyond the domain of water stability. Therefore, metallic iron can be added to the system and converted into recuperable ferric and ferrous species, but metallic iron cannot be recuperated.

In aerobic, nitrification, and denitrification steps, and sometimes in facultative anaerobic steps of the present method, ferrous ions are oxidized to ferric ions either by oxygen supplied through aeration or via reduction of nitrites and nitrates mainly to molecular nitrogen, or by halogenated organics. In biomass oxidation, it is oxidized mainly to carbon dioxide and water by ferric ions becoming ferrous ions. Thus formed ferrous and ferric ions are repeatedly used in the said aerobic, nitrification, denitrification, and the said biomass oxidation steps. Insoluble ferric forms are enmeshed with the sludge and retained (recuperated) in the system. In addition to the benefits of mediating oxidation-reduction steps in biological processes, ferric hydroxide is also a coagulant for the biomass. It beneficially enhances sludge separation. In batch processes, the repetition of these steps occurs in the same space on a time sequence. In continuous flow systems, the steps are repeated in spatially separated steps in different reservoirs by recycling the sludge composed of biomass and the said abiotic species in solid form between these steps. The recycled biomass can be separated from the wastewater being treated and further directed for the repeated treatment, or it can be directed for the repeated treatment together with the said wastewater as mixed liquor. Alternatively, the spatial separation can be provided due to concentration gradients within a single tank with nonhomogeneous mixing. Nonhomogeneous mixing can be either due to concentration gradients within incompletely mixed tank, or due to unsteady-state (time variable) concentration gradients within biological flocs and films. Therefore, it is biomass (or sludge including the biomass and insoluble forms of oxidation-reduction mediator species) that is repeatedly treated in the at least one step of oxidizing terminal reducing agents (hydrocarbons and/or biomass) wherein the recuperable oxidation-reduction species are reduced, and at least one step of reducing terminal oxidizers (oxygen, air, or nitrites and nitrates) whereby the recuperable oxidation reduction mediator species are oxidized, while the wastewater may be, but not necessarily, repeatedly treated in these steps. The recuperable oxidation-reduction mediator species function as intermediate oxidation-reduction agents. In prior art systems for phosphorus removal, iron concentration is provided at the level needed to remove phosphorus. This is usually a small concentration. Moreover, iron used for binding phosphates is rapidly evacuated from the system and new iron needs to be continuously fed. In the present system, concentration of iron ions can be from a fraction of 1 g/L to several grams per liter, that is at least one to several orders of magnitude greater than in phosphorus removal systems. At these concentrations, a constantly present pool of charged iron is created in the system. At concentration of 1 g $Fe^{3+}$/L, the estimated equivalent "oxidation capacity" as compared to oxygen is $1\times(8/56)=0.143$ g O/L, or 143 mg O/L (where 8 and 56 are atomic weights of oxygen and iron per 1 electron). This "oxidation capacity" is much greater than that of oxygen in conventional air aeration systems and exceeds that of high purity oxygen systems by a factor greater than two. In conventional biological denitrification processes, the "reducing power" of ferrous ions used in denitrification steps can also exceed that of the purchased organics. Unlike organics, for example methanol, in denitrification processes, recuperable iron ions do not constitute BOD that needs to be removed after the conventional denitrification step. Recyclable iron ions do not contribute to the growth of biomass in denitrification and post denitrification steps as organics do. On the contrary, the biomass is oxidized in the recuperation cycle of iron ions. Significantly increased oxidation-reduction capacity (or driving force) in the system results in dramatic increases in rates and efficiency of denitrification and sludge oxidation steps. It is understood that iron is used here as an example and many other recuperable oxidation-reduction mediator specie types can also be used. It is also understood that when selecting the said species, skillful in art can consider physical-chemical and other properties of specific recuperable species.

Cobalt and nickel are other practicable species to be used in the present method. A simplified pH-ORP diagram for cobalt is given in FIG. 2. Similarly to iron, cobalt and nickel exist in zero-, di-, and tri-valence states. In contrast to iron, nickel and cobalt in zero-valence state can exist within the domain of water stability. Moreover, a portion of the area of stability of cobalt and nickel within the stable water domain corresponds to conventional anaerobic processes, particularly, many methanogenic processes having ORP approximately −250 to −400 mV. Therefore, metallic (zero-valence) cobalt, or nickel, can be formed in anaerobic processes from tri-, and di-valence forms. Accordingly, these species can be used in the present method in three oxidation states and form three zones separated by solid lines that can be used as oxidation and reduction zones. Zero-valence species are very powerful reducing agents for many toxic and recalcitrant constituents found in many wastewater, solid wastes, contaminated soils, and other wastes. These reductions are described in U.S. Pat. No. 5,348,629 and co-pending patent application No. PCT/US98/08649 which are made a part of this application by inclusion. In di-, and tri-valence forms, nickel and cobalt can form poorly soluble hydroxides and oxides. Accordingly, they can also be retained and recuperated in biological processes, including aerobic and some anoxic steps.

The method further provides at least one recuperable alkalinity control specie. Such specie can be selected from calcium, zinc, aluminum, iron, nickel, cobalt, cesium, and combinations thereof. Effects of such species are described in the co-pending U.S. application Ser. No. 08/982,030, now U.S. Pat. No. 5,798,043, which is made a part of the present application by inclusion.

The present method can be conducted in a multi step system. The sequence of the said steps is selected from a group comprising sequential treatment steps, parallel treatment steps, parallel-sequential treatment steps, treatment steps in a racetrack arrangement, treatment steps with recycling the said wastewater and the said biomass among and between the said steps, and combinations thereof. The operation mode of at least one step in the said system is selected from a group comprising continuous operation, batch operation, continuous operation with flow equalization, and combinations thereof. The said batch operation steps are selected from the group comprising aerobic treatment, nitrification treatment, anoxic treatment, denitrification treatment, biomass oxidation treatment, facultative anaerobic treatment. The said batch operation steps are selected from the group comprising filling step, filling-stripping step, reacting step, reacting-stripping step, settling step, decanting step, and combinations thereof.

In continuous and batch modes of the present method, the said wastewater can be repeatedly treated in at least two functional zones for conducting the steps selected from the group comprising oxygen enriched treatment, aerobic treatment, nitrification treatment, anoxic treatment, denitrification treatment, facultative anaerobic treatment, sulfate reduction, carbonate reduction, sludge conditioning, biomass oxidation treatment, and combinations thereof.

The said biomass in the said system is composed of microorganisms selected from the group comprising obligate aerobic, facultative aerobic, nitrifying, denitrifying, ferrous iron oxidizing, ferric iron reducing, anoxic, facultative anaerobic, sulfate reducing, methanogenic, obligate anaerobic, and mixtures thereof. Further, the present method can provide at least one step of anaerobic sludge conditioning to produce biomass enriched with methanogens, and at least one step of feeding at least a portion of the said conditioned sludge with enhanced content of methanogens in at least one step of the said system.

When wastewater contains nitrogen oxy ions, nitrites and nitrates, the present method can be conducted in a system comprising at least one denitrification step, at least one step of the said biomass oxidation (or other reduction step), a step of treating the said biomass repeatedly in the said denitrification and biomass oxidation steps, and a step of charging in the said system at least one recuperable abiotic specie with a variable oxidation state.

The present process can be carried out in an apparatus comprising at least one biological wastewater treatment zone with aerobic conditions, and/or at least one denitrification zone with the use of recuperable oxidation-reduction mediator species in a lower oxidation state, and at least one zone of oxidizing the said biomass with the use of recuperable oxidation-reduction mediator species in a higher oxidation state. Transferring means for the repeated treatment of the said biomass in the said biological treatment zones can also be provided. At least two of the said biological treatment zones and the sludge oxidation zone can be combined in a single reservoir. Moreover, at least two of the said zones can be combined in the same space in a single reservoir.

The new apparatus can be a multi zone system. The zone connection in the said multi zone system is selected from a group comprising sequential treatment zones, parallel treatment zones, parallel-sequential treatment zones, treatment zones in a racetrack arrangement, treatment zones with recycling the said wastewater and the said biomass among and between the said zones, and combinations thereof. An apparatus can further be provided with a zone of anaerobic treatment of the said wastewater.

DRAWINGS

DETAILED DESCRIPTION OF INVENTION

Figure 3:
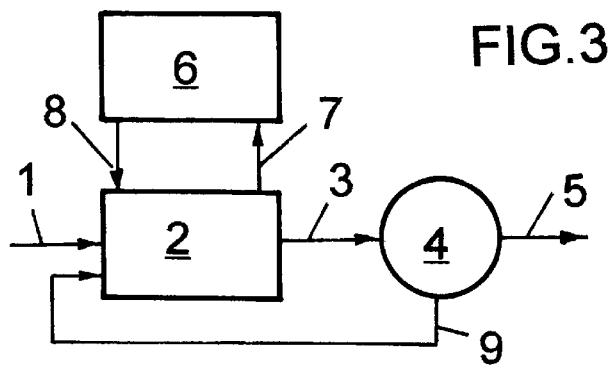
FIG. 3 is a flowchart of a denitrification process with biomass oxidation in a sideline zone with reducing conditions.

FIG. 3 is a flowchart of a denitrification process with biomass oxidation in a sideline zone with reducing conditions. This embodiment is operated as follows. The system is charged with a recuperable oxidation-reduction mediator species having variable oxidation state, for example, with iron salt, whereby iron can change between the higher valence ions (trivalent ferric ions) and lower valence ions (divalent ferrous ions). Wastewater loaded with organics and nitrites and/or nitrates is fed via line 1 in the denitrification zone 2. In this zone, organics are biologically oxidized to carbon dioxide and water and a new biomass is formed. Simultaneously, nitrites and/or nitrates are partially reduced to molecular nitrogen and nitrous and nitric oxides (gaseous nitrogen forms), and the remaining nitrites and nitrates oxidize ferrous ions to ferric with the conversion to gaseous nitrogen forms. A portion of the mixed liquor from zone 2 is directed via line 3 to the final sludge separator 4 (a clarifier or other means), the clarified treated wastewater is evacuated via line 5 and the separated sludge is recycled to zone 2 via line 9. The other portion of the mixed liquor is directed via line 7 in the biomass oxidation zone 6 and returned back in zone 2 via line 8. In zone 6, ferric ions oxidize biomass and revert to ferrous ions; the latter are recycled in zone 2 to be used in denitrification process. Biomass oxidation causes a dramatic excess sludge reduction. Iron ions form insoluble phosphates which particles become enmeshed in the sludge and are removed from the system with the excess sludge. At pH range of biological treatment, virtually insoluble ferric hydroxide and sparingly soluble ferrous hydroxide are formed. Accordingly, iron ions charged in the system circulate between zones 2 and 6 and the sludge separator 4.

The advantages of this process over the prior art are as follows. Nitrites and nitrates are removed by oxidizing ferrous ions to ferric. In prior art, methanol or other purchased organics are used instead. Moreover, ferric ions are further used to oxidize biomass thus reducing the excess sludge. This is an unexpected benefit of the present invention. Because iron ions are used for denitrification and biomass oxidation, there is always an excess iron insuring complete phosphorus removal. In contrast to conventional phosphorus removal methods with metal salt additions, losses of the charged iron are very low. Accordingly, iron ions and other similar species are called herein the recuperable abiotic species. The iron losses are due to binding phosphorus, and due to some loss of iron hydroxides with a small quantity of waste sludge. However, the iron lost with sludge is a coagulant that would be added to the sludge later in the sludge treatment processes. Therefore, all charged iron is beneficially used in the system. Moreover, sludge oxidized in the present process is well mineralized and easy to dewater. It will not need stabilization in a dedicated sludge treatment process. Optionally, the waste sludge can by hydrolyzed by using chemical, thermal, or anaerobic biological hydrolysis, and the said recuperable oxidation-reduction mediator species can be almost completely recovered for the use in the present process. The remaining residue is largely an insoluble mineral material that can be used, for example, as a fill in construction projects.

Figure 1:
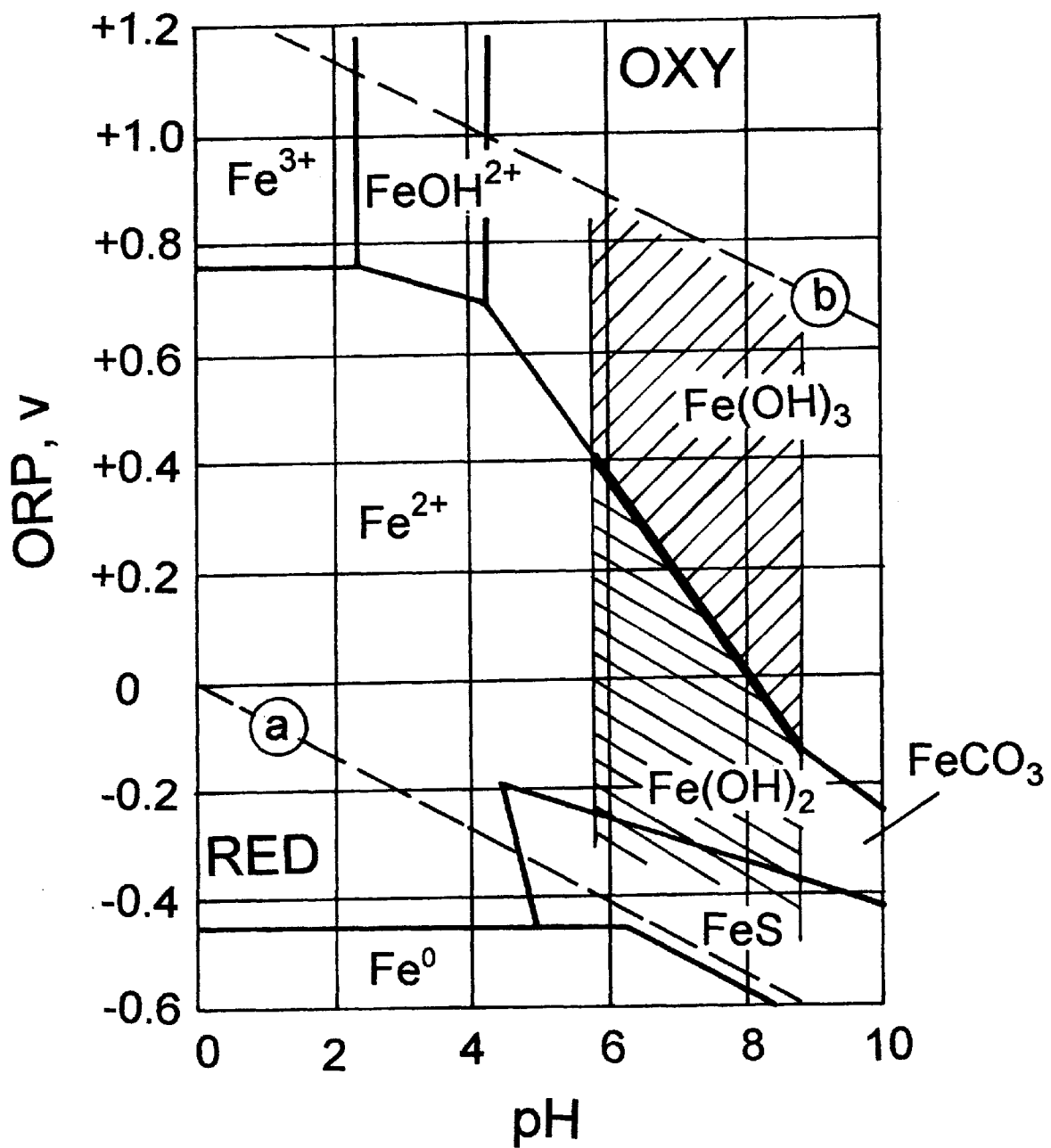
FIG. 1 is a simplified pH-ORP diagram for iron.
Figure 4:
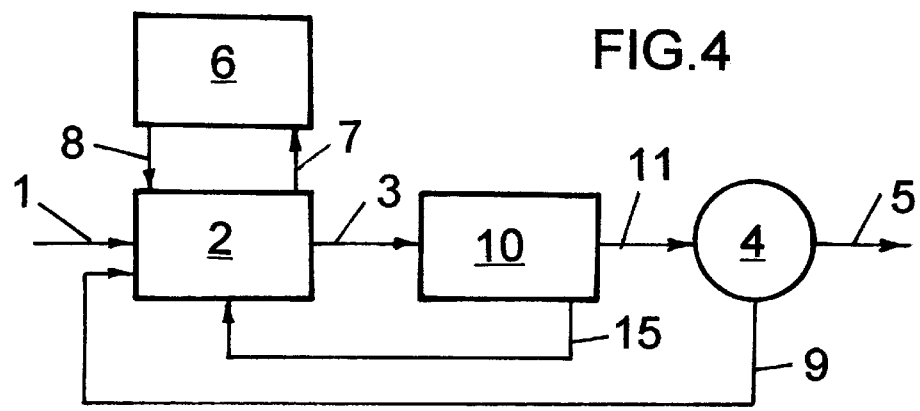
FIG. 4 is a flowchart of a process of FIG. 1 with an added aerobic process step following the denitrification stage.

FIG. 4 is a flowchart of a process of FIG. 1 with an added aerobic process step 10 following the denitrification stage 2. A recycle line 15 can also be provided. This embodiment can be used for removal of the influent nitrogen in forms different from nitrites and nitrates. For example, wastewater influent can include organic and/or ammonia nitrogen. In this embodiment, nitrogen is converted into nitrates and nitrites in the aerobic zone 10 and recycled in the denitrification zone 2 via line 15. The rest of the operations are the same as previously described and will not be repeated. Due to oxidation to ferric ions, loss of iron with the effluent will be virtually eliminated.

Figure 5:
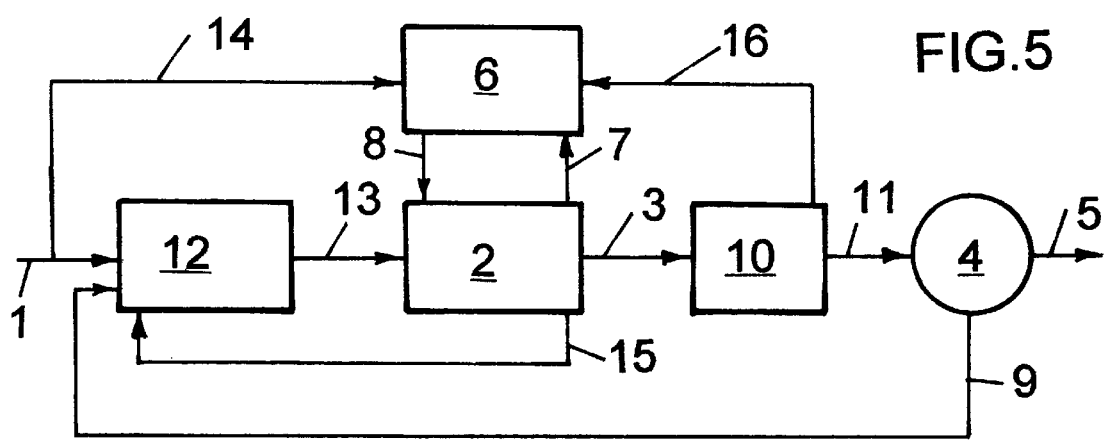
FIG. 5 is a flowchart of a process of FIG. 2 with an added aerobic process step preceding the denitrification step.

FIG. 5 is a flowchart of a process of FIG. 4 with an added aerobic process step 12 preceding the denitrification step 2. This figure also shows a mixed liquor recycle line 15 between zones 2 and 12, a mixed liquor recycle line 16 between zones 19 and 6, and a line 14 for feeding a portion of the influent to zone 6. In zone 12, organics are converted to new biomass, carbon dioxide, and water, and nitrogen is largely converted into nitrites and nitrates. Zones 2 and 6 are operated as previously described. The aerobic zone 10 serves as a zone of thorough organics removal and iron oxidation. Additional nitrification can also occur in this zone. Recycle line 15 is optional and should preferably be used when treating wastewater with high nitrogen content. Recycling denitrified flow to zone 12 reduces concentration of nitrites and nitrates and pH swings in the system. Recycle line 16 can be used to deliver ferric ions directly to the biomass oxidation zone 6 to oxidize more biomass. Additionally, recycles via lines 15 and 16 equalize the influent organics and nitrogen concentrations. Line 14 provides direct feed of organics with a portion of the influent to the biomass oxidation zone 6 for consumption of excess ferric ions in the system.

Figure 6:
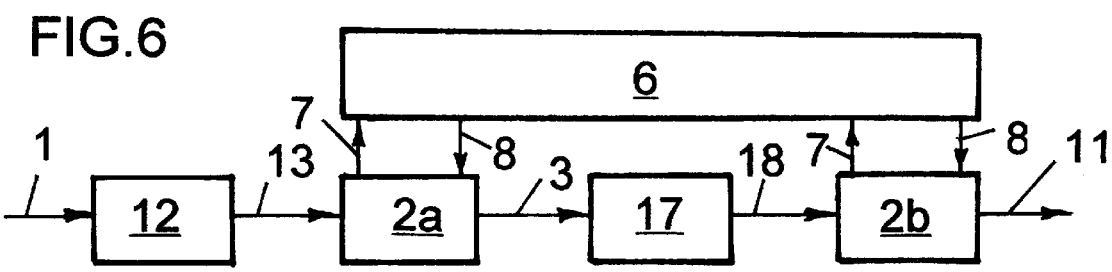
FIG. 6 is a flow chart of a portion of a treatment system with two sequential aerobic-denitrification zones and a single dedicated biomass oxidation zone.

FIG. 6 is a flow chart of a portion of a treatment system with two sequential aerobic-denitrification zones 12 and 2a and 17 and 2b and a single dedicated biomass oxidation zone 6. Such arrangement can be combined with additional aerobic and sludge separation zones and recycle lines as previously described. This arrangement can be used for thorough nitrogen removal. The single biomass oxidation zone in this embodiment is one more illustration of possible modifications that can be easily designed by a skillful in art based on the present teaching.

Figure 7:
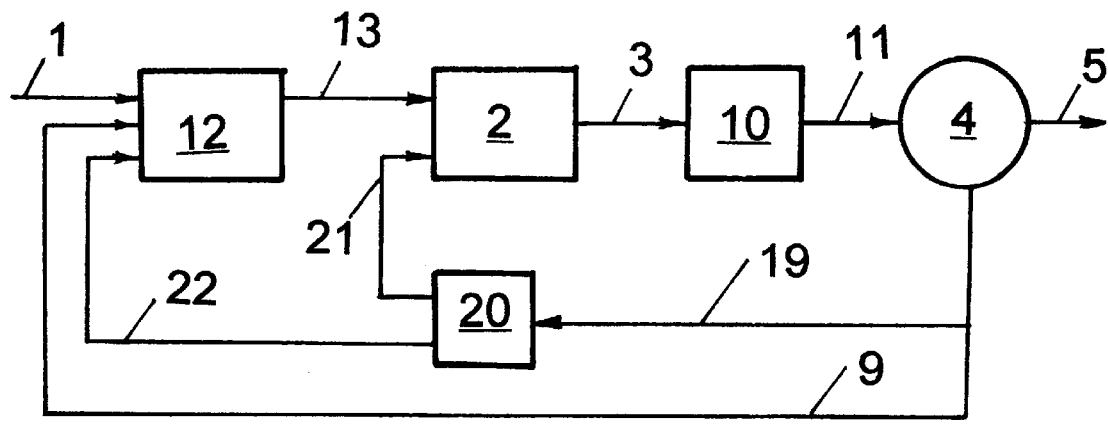
FIG. 7 is a flowchart of a denitrification process with a dedicated biomass oxidation zone in the sludge recycle line.

FIG. 7 is a flowchart of a denitrification process with the dedicated biomass oxidation zone in the sludge recycle line. In this embodiment, the wastewater influent is fed via line 1 in the aerobic zone 12 where organics are converted to new biomass, carbon dioxide and water, and nitrogen species are oxidized to nitrites and nitrates. From zone 12, the mixed liquor is directed via line 13 into zone 2 for denitrification with ferrous ions. Further, mixed liquor goes via line 3 to an aerobic zone 10 for thorough removal of organics and oxidation of ferrous ions to ferric, which form ferric hydroxide. A mixed liquor carrying biomass and flocculated ferric hydroxide enter the sludge separator 4. Upon separation, the clarified treated wastewater is discharged via line 5. The separated sludge comprising biomass, ferric hydroxide, and the accumulated inert constituents is evacuated via line 9. It is further directed in part to the aerobic zone 12, while the balance of the sludge is fed through line 19 to the biomass oxidation zone 20 and further via line 21 to zone 2. Optionally, a portion of sludge from zone 20 can be fed via line 22 in zone 12. Biomass is partially oxidized in zone 20 by ferric ions becoming ferrous ions.

Figure 8:
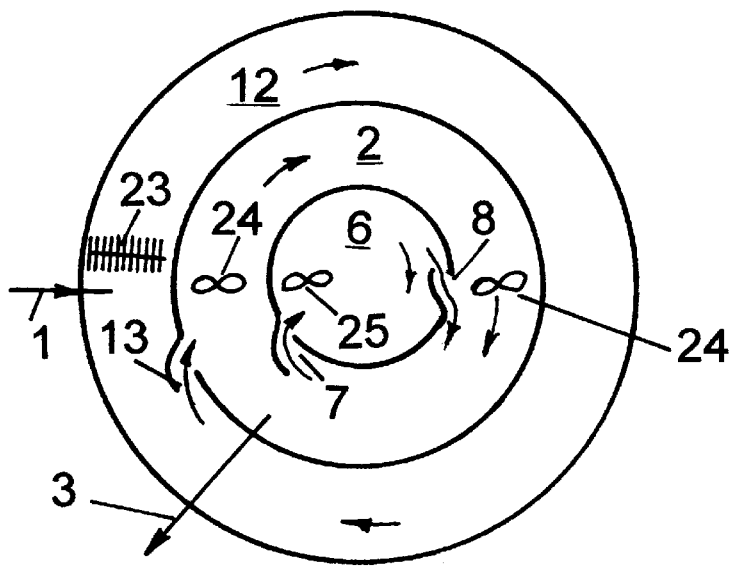
FIG. 8 is a layout of a race track system with an aerobic, denitrification and biomass oxidation zones.

FIG. 8 is a layout of a race track system with an aerobic, denitrification and sludge oxidation zones. This embodiment comprises an influent line 1, a circular aerobic zone 12 embracing a circular denitrification zone 2, the central biomass oxidation zone 6, and the line 3 leading to the sludge separator. The sludge separator and sludge return means are not shown. Brush aerators 23 are aerating and propelling mixed liquor in zone 12. Propeller mixers 24 and 25 propel and mix mixed liquor in zones 2 and 6 respectively. Zones 12, 2, and 6 communicate hydraulically with the use of gates 13, 7 and 8. This layout corresponds to the flow chart shown in FIG. 4 and is operated as previously described. Other modification of racetrack layouts and equipment can be used as known to skillful in art at the time of design. Present teachings are sufficient for designing the process variants not shown in this specification.

Figure 9:
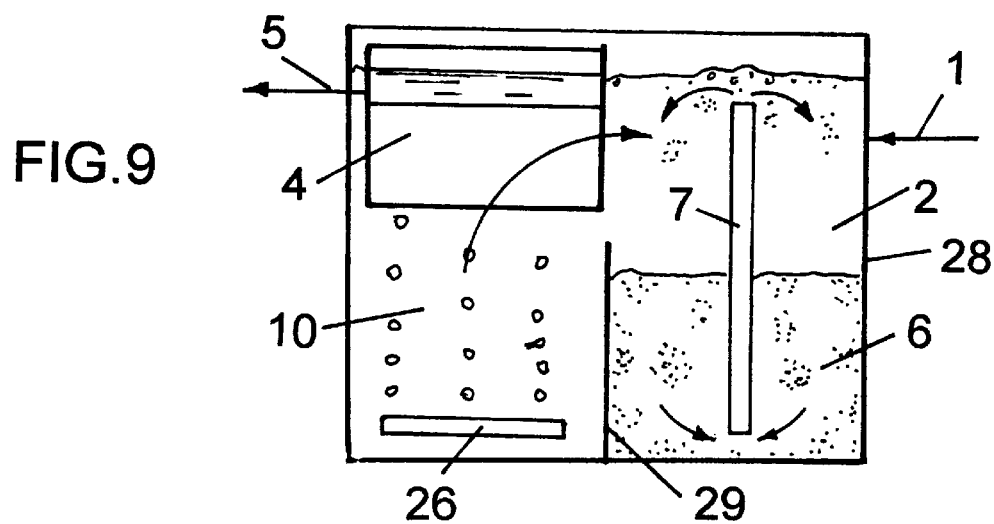
FIG. 9 is a cross section of a denitrification-aeration-biomass oxidation unit.

FIG. 9 is a cross section of a denitrification-aeration-biomass oxidation unit. This system comprises a reservoir 28 accommodating functional zones 2, 6 and 10 as described in FIG. 4. Accordingly, the system is operated as previously described. Only specific features related to this particular layout are discussed. In this system, zone 2 is exposed above zone 6 and the sludge comprising the biomass and iron hydroxides is densified in zone 6. This reduces the volume of the biomass oxidation zone 6. The sludge can be lifted from zone 6 to zone 2 via standpipe 7, which can be fitted with an airlift, a pump, a jet pump, or other lifting means. Aerators 26 and clarifiers 4 are shown in zone 10. This embodiment does not have well defined borders separating zones 2, 6, and 10, and many lines shown in FIG. 4 for connecting these zones are absent. Other modifications of combined layouts and equipment can be used as known to skillful in art at the time of design. Present teachings are sufficient for designing the process variants not shown in this specification.

Figure 10:
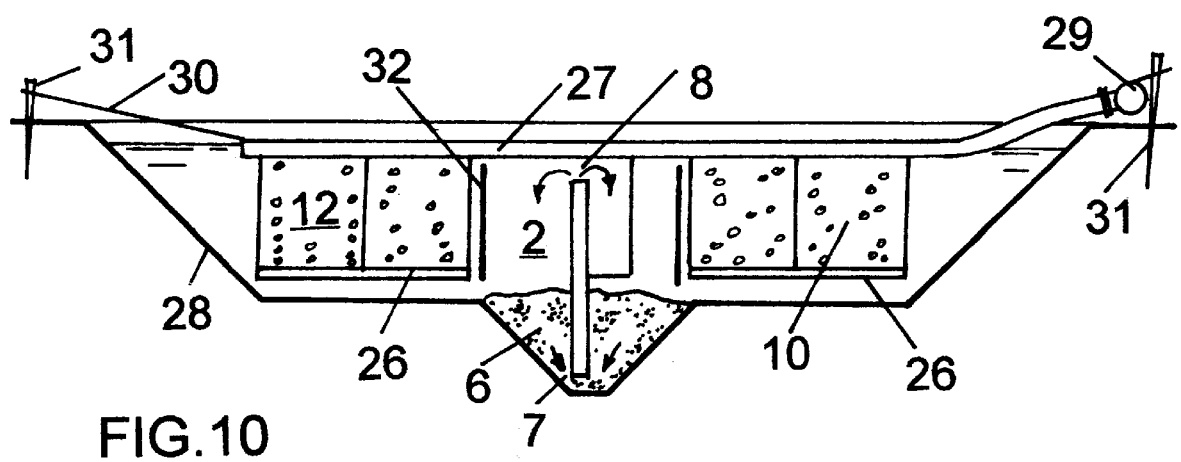
FIG. 10 is a modified Biolac system with added denitrification-biomass oxidation zones.

FIG. 10 is a modified Biolac system with added denitrification-biomass oxidation zones. Biolac is described in U.S. Pat. Nos. 4,287,062, 4,797,212, and 5,472,611. This system comprises a reservoir 28 accommodating functional zones 12, 2, 6, and 10 as described in FIG. 5. Accordingly, the system is operated as previously described. Only specific features related to this particular layout are discussed. In this system, zone 2 is exposed above zone 6 and the sludge comprising the biomass and iron hydroxides is densified in zone 6. This reduces the volume of the biomass oxidation zone 6. The sludge can be lifted from zone 6 to zone 2 via standpipe 7, which can be fitted with an airlift, a pump, a jet pump, or other lifting means. Floating aerators 26 are shown in aerobic zones 12 and 10. Floating clarifiers (not shown) can also be installed within the reservoir 28. In contrast to other described systems, this embodiment has floating and moving aerators 26 and a floating and moving sludge transfer means 7. Aerators 26 and the sludge transfer means 7 are connected to and suspended from a floating air pipe 27, which is connected to an air conduit 29. Structural support for the floating assembly including elements 7, 26, and 27 is provided by a cable 30 and anchors 31. Optional curtains 32 can be provided for a better separation of the denitrification zone 2 from the aerobic zones 12 and 10. This embodiment also does not have well defined borders separating zones 2, 6, and 10, and many lines shown in FIG. 3 for connecting these zones are absent. Other modifications of combined layouts and equipment can be used as known to skillful in art at the time of design. For example, zones 2 and 6 can be accommodated over a flat bottom using partitions, walls of the reservoir 28 can be vertical, and a conventional clarifier for sludge separation can be installed within or beyond the reservoir 28.

Addition of calcium, for example lime, to the present system is also beneficial. In aerobic zones, such as zones 10 and 12, carbon dioxide is stripped and insoluble calcium carbonate is formed. This insoluble compound is retained in the system and transferred in the denitrification zones 2 and further in biomass oxidation zones 6. In zones 2 and 6, carbon dioxide is formed and not well stripped and some volatile fatty acids can also be formed, thus producing acidification of the media in these zones. Under such conditions calcium carbonate will convert to calcium bicarbonate thus buffering pH. It is possible to maintain near optimal pH values in all zones in this system for nitrification, denitrification, and iron oxidation. Addition of small quantities of catalysts, for example, manganese or copper salts, further increases the rate and efficiency of iron oxidation in the system. Powdered (pulverized) activated carbon (PAC), and or powdered or fine-crushed coal can also be used to increase the rate and efficiency of oxidation-reduction processes in the present system. Similarly to iron and calcium, losses of PAC are very small. Therefore, it can be charged once and small losses can be periodically replenished.

The pool of recuperable oxidation-reduction species in biological treatment systems with fluctuating flows and concentrations helps to smooth the dynamic variations in the output parameters (effluent quality) and in demands for aeration and other operating conditions. For example, during a low organics loading rate in a biological treatment of BOD (COD) with or without nutrients removal the oxidized forms of the recuperable oxidation-reduction species accumulate in the system. During the period of greater than average loading rate, the previously accumulated oxidized species are reduced thus minimizing the peak oxygen demand. Respectively, the aeration system does not need to be designed for the maximum BOD and ammonia nitrogen loading rates. It can correspond to a somewhat prudently greater than the average loading rate. Such a dynamic behavior of the present system is a significant unexpected benefit for the cost reduction and simplicity of operation.

Figure 2:
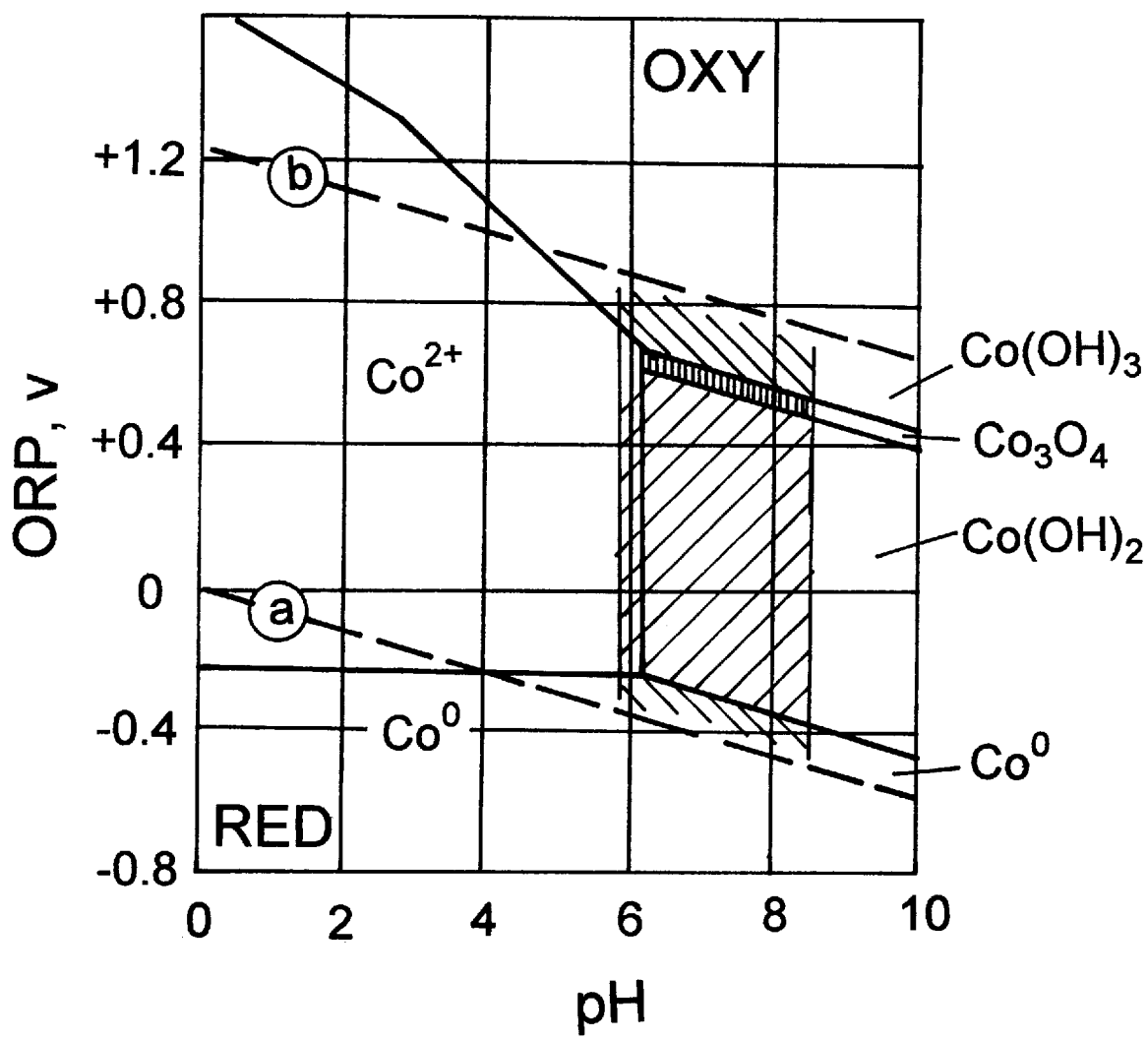
FIG. 2 is a simplified pH-ORP diagram for cobalt.

FIGS. 1 and 2 define significant properties of recuperable oxidation-reduction mediator species. These figures also clearly show that the boundaries between oxidation and reduction domains are different for the selected species. Moreover, some species can divide the total oxidation-reduction domain of biological processes into more than two oxidation and reduction domains. Accordingly, definition of oxidizing and reducing biological steps should be coordinated with the properties of selected recuperable oxidation-reduction mediator specie. Biological processes can be graded from oxidizing to reducing as follows: high purity oxygen systems, air aerated systems including nitrification, denitrification systems, ferric iron reduction systems, sulfate reduction systems, carbonate reduction (methanation) systems. Corresponding primary oxidizers, or primary electron acceptors, are oxygen, oxygen of air, nitrites and nitrates, ferric iron, sulfates, and carbonates. Some organics, particularly, halogenated compounds, can also be oxidizers. Hydrocarbons (admixtures in the wastewater) and biomass (ultimately a product derived from the hydrocarbons) constitute terminal reducing agents, or terminal electron donors. The recuperable oxidation-reduction species are the secondary oxidizing species (electron acceptors) in their oxidation reactions of the terminal reducing agents and they are the secondary reducing agents (electron donors) in their reduction reactions with the primary oxidizers. High purity oxygen systems and carbon dioxide reduction systems are always oxidation and reducing steps in the context of this method. However, all other steps in the oxidation-reduction scale can be either oxidation or reduction steps depending on the position of the boundary line (or lines) in the pH-ORP diagram for the selected recuperable oxidation-reduction mediator specie, or a combination of such species. It is understood that a combination of several recuperable oxidation-reduction mediator species can be used simultaneously. These species can perform as described in this method, and also react with each other as known to skillful in art. For example, nickel and cobalt can cement on zero-valence iron, various oxidation-reduction or other processes known from fundamental sciences and engineering applications can occur. These interactions can produce synergistic beneficial effects in the present method. For example, cementation of a more electropositive specie on the a less electropositive one accelerates the target process rate and efficiency. Accordingly, the present invention meets the objectives: to provide a simple, reliable, efficient and economical system for removal of organics and nutrients with low generation of sludges.

It will therefore be understood by those skilled in the art that particular embodiments of the invention here presented are by way of illustration only, and are meant to be in no way restrictive; therefore numerous changes and modifications may be made, and the full use of equivalents resorted to, without departing from the spirit and the scope of the invention as outlined in the appended claims.

I claim:

1. An oxidation-reduction treatment of wastewater for producing treated effluent in a system with biomass and involving terminal reducing agents and primary oxidizers, comprising (a) a step of charging at least one recuperable oxidation-reduction mediator specie in the said system, (b) at least one step of oxidizing at least one terminal reducing agent with reduction of the said at least one recuperable oxidation-reduction mediator specie, (c) at least one step of reducing at least one primary oxidizing agent with oxidation of the said at least one recuperable oxidation-reduction mediator specie, (d) at least one step of retaining the said at least one recuperable oxidation-reduction mediator specie in the said system in a form insoluble in the said effluent, and wherein at least a portion of the said wastewater together with the said at least one recuperable oxidation-reduction mediator specie are repeatedly treated in the said steps (b) and (c).

2. The method as claimed in claim 1, wherein the said step of reducing the primary oxidizer is selected from the group consisting of oxygen enriched treatment, aerobic treatment, nitrification treatment, anoxic treatment, denitrification treatment, facultative anaerobic treatment, and combinations thereof.

3. The method as claimed in claim 1, wherein the said step of oxidizing at least one terminal reducing agent is selected from the group consisting of nitrification treatment, anoxic treatment, denitrification treatment, facultative anaerobic treatment, sulfate reduction, carbonate reduction, sludge conditioning, biomass oxidation treatment, and combinations thereof.

4. The method as claimed in claim 1, wherein the said wastewater is selected from a group consisting of water, wastewater, aqueous industrial, agricultural and production materials, industrial, agricultural and production gases, polluted air, gaseous and vent emissions, solid waste, materials of plant, animal, or fossil origin, and solid industrial, agricultural or production streams, and combinations thereof.

5. The method as claimed in claim 1, wherein the said recuperable oxidation-reduction mediator species are selected from the group consisting of metallic ions, metal containing species, oxyions, nonbiodegradable and insoluble inorganic constituents with variable oxidation-reduction states, nonbiodegradable and insoluble organic constituents with variable oxidation-reduction states, redox ion exchange materials, and combinations thereof.

6. The method as claimed in claim 5, wherein the said metallic ions and the said metal containing species include metals selected from the group consisting of iron, nickel, cobalt, manganese, vanadium, and combinations thereof.

7. The method as claimed in claim 1 and further providing at least one recuperable alkalinity control specie.

8. The method as claimed in claim 7, wherein the said recuperable alkalinity control specie is selected from the group consisting of calcium, zinc, aluminum, iron, nickel, cobalt, cesium, and combinations thereof.

9. The method as claimed in claim 1, wherein the said treatment system is a multi step system and the sequence of the said steps in the said multi step system is selected from a group consisting of sequential treatment steps, parallel treatment steps, parallel-sequential treatment steps, treatment steps in a racetrack arrangement, treatment steps with recycling the said wastewater and the said biomass among and between the said steps, and combinations thereof.

10. The method as claimed in claim 1, wherein the operation mode of at least one step in the said system is selected from a group consisting of continuous operation, batch operation, continous operation with flow equalization, and combinations thereof.

11. The method as claimed in claim 10, wherein the said batch operation steps are selected from the group consisting of filling step, filling-stripping step, reacting step, reacting-stripping step, settling step, decanting step, and combinations thereof.

12. The method as claimed in claim 1, wherein the said biomass in the said system is composed of microorganisms selected from the group consisting of obligate aerobic, facultative aerobic, nitrifying, denitrifying, ferrous iron oxidizing, ferric iron reducing, anoxic, facultative anaerobic, sulfate reducing, methanogenic, obligate anaerobic, and mixtures thereof.

13. The method as claimed in claim 1, wherein at least one of the said steps of oxidizing and at least one of the said steps of reducing are conducted in different functional zones in a single reservoir.

14. The method as claimed in claim 1, wherein at least one of the said steps of oxidizing and at least one of the said steps of reducing are conducted in the same space in a single reservoir.

15. A method of biological wastewater treatment in a system with biomass for removal of nitrogen oxyions and for producing treated effluent comprising (a) a step of charging in the said system at least one recuperable oxidation-reduction mediator specie, (b) at least one step of oxidizing at least one terminal reducing agent while reducing said mediator specie, (c) at least one step of reducing the said nitrogen oxyions while oxidizing said mediator specie, whereby the said nitrogen oxyions form primary oxidizers, (d) a step of retaining the said at least one recuperable oxidation-reduction mediator specie in the said system in a form insoluble in the said effluent, and wherein the said biomass and the said at least one recuperable oxidation-reduction mediator specie are repeatedly treated in the said steps (b) and (c).

16. The method as claimed in claim 15, wherein the said step (b) is selected from the group consisting of facultative anaerobic treatment, sulfate reduction, carbonate reduction, sludge conditioning, biomass oxidation treatment, and combinations thereof.

17. A method of biological wastewater treatment in a system with biomass, whereby the said biomass generation is minimized and a treated effluent is produced comprising (a) a step of charging in the said system at least one recuperable oxidation-reduction mediator specie, (b) at least one biomass oxidation step, whereby the said biomass forms a terminal reducing agent, (c) at least one step of reducing at least one primary oxidizer, and (d) a step of retaining the said at least one recuperable oxidation-reduction specie in the said system in a form insoluble in the said effluent, wherein the said biomass is repeatedly treated in the said steps (b) and (c), whereby the said step of reducing the primary oxidizer is a step of oxidizing the said recuperable oxidation-reduction mediator specie, and the said biomass oxidation step is a step of reduction of the said recuperable oxidation-reduction mediator specie.

18. The method as claimed in claim 17, wherein the said step of reducing at least one primary oxidizer is selected from the group consisting of oxygen enriched treatment, aerobic treatment, nitrification treatment, anoxic treatment, denitrification treatment, facultative anaerobic treatment, and combinations thereof.

19. A method of biological treatment of wastewater comprising hydrocarbons in a system with biomass, whereby the said hydrocarbons are oxidized and a treated effluent is produced comprising (a) a step of charging in the said system at least one recuperable oxidation-reduction mediator specie, (b) at least one hydrocarbons oxidation step, whereby the said hydrocarbons form terminal reducing agents, (c) at least one step of reducing at least one primary oxidizer, and (d) a step of retaining the said at least one recuperable oxidation-reduction specie in the said system in a form insoluble in the said effluent, wherein the said biomass is repeatedly treated in the said steps (b) and (c), whereby the said step of reducing the primary oxidizer is a step of oxidizing the said recuperable oxidation-reduction mediator specie, and the said hydrocarbons oxidation step is a step of reduction of the said recuperable oxidation-reduction mediator specie.

20. A method of biological wastewater treatment in a system with biomass for removal of toxic and recalcitrant organics and for producing treated effluent comprising (a) a step of charging in the said system at least one recuperable oxidation-reduction mediator specie, (b) at least one step of oxidizing at least one terminal reducing agent while reducing said mediator specie, (c) at least one step of reducing the said toxic and recalcitrant organics while oxidizing said mediator specie, whereby the said toxic and recalcitrant organics form primary oxidizers, (d) a step of retaining the said at least one recuperable oxidation-reduction mediator specie in the said system in a form insoluble in the said effluent, and wherein the said biomass and the said at least one recuperable oxidation-reduction mediator specie are repeatedly treated in the said steps (a) and (b).

21. The method as claimed in claim 20, wherein the said step (b) is selected from the group consisting of facultative anaerobic treatment, sulfate reduction, carbonate reduction, sludge conditioning, biomass oxidation treatment, and combinations thereof.

* * * * *